Patented Oct. 13, 1953

2,655,527

UNITED STATES PATENT OFFICE 2,655,527

CARBETHOXYCYCLOHEXANONES

John A. Hogg, Jerome Korman, William Bradley Reid, Jr., and Alan H. Nathan, Kalamazoo, Mich., assignors to The Upjohn Company, Kalamazoo, Mich., a corporation of Michigan No Drawing. Application February 24, 1951, Serial No. 212,671

9 Claims. (Cl. 260—468)

This invention relates to a group of 2-(β-disubstituted aminoethyl)-2-carbethoxy-4-hydrocarbonoxycyclohexanones and to a method for the production thereof. The present application is a continuation-in-part of our application Serial No. 119,777, filed October 5, 1949.

The compounds of the present invention have the general structural formula:

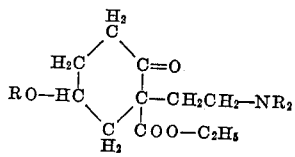

wherein each R is a hydrocarbon radical containing from one to seven carbon atoms, inclusive, such as the methyl, ethyl, propyl, isopropyl, butyl, isobutyl, pentyl, hexyl, heptyl, cyclopropyl, cyclobutyl, cyclopentyl, cyclohexyl, phenyl and benzyl radicals and the like. In the compounds of this invention the radicals designated R may be the same or different hydrocarbon radicals. The group RO— is herein termed a hydrocarbonoxy group, and the preferred embodiment of R is methyl.

The products of this invention, when subjected to hydrolysis, are hydrolyzed and decarboxylated to 2-(β-disubstituted aminoethyl)-4-hydrocarbonoxycyclohexanones which are more fully disclosed and claimed in our copending application Serial 212,672, filed February 24, 1951.

Treatment of the resulting 2-(β-disubstituted aminoethyl) - 4-hydrocarbonoxycyclohexanones with Grignard reagents or alkali-metal alkyls gives addition products which, after hydrolysis, yield 1-alkyl-2-(β-disubstituted aminoethyl)-4-hydrocarbonoxycyclohexanols, which are more fully disclosed and claimed in our copending application Serial 212,673, filed February 24, 1951.

Dehydration of the resulting 1-alkyl-2-(β-disubstituted aminoethyl)-4-hydrocarbonoxycyclohexanols produces 1 - alkyl - 2 - (β - disubstituted aminoethyl) - 4 - hydrocarbonoxycyclohexenes which are more fully disclosed and claimed in our copending application Serial 212,674, filed February 24, 1951.

Addition of cyanogen bromide to the 1-alkyl-2-(β-disubstituted aminoethyl)-4-hydrocarbonoxycyclohexenes described hereinbefore and decomposition of the resulting quaternary salt give 1 - alkyl - 2 - (β - bromoethyl) - 4 - hydrocarbonoxycyclohexenes, which are more fully disclosed and claimed in the copending application of John A. Hogg, Serial 212,675, filed February 24, 1951.

The compounds of the present invention can be prepared starting with a para-hydrocarbonoxyphenol (for example, a monoalkyl ether of hydroquinone) having the formula:

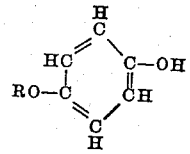

wherein R is a hydrocarbon radical as specified in the foregoing definition of R. Such compounds readily react with three molecules of hydrogen in the presence of a nickel catalyst at temperatures between approximately 130 and approximately 300 degrees centigrade to yield the corresponding saturated compound, a para-hydrocarbonoxycyclohexanol having the formula:

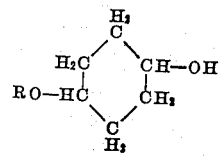

which can be oxidized to a para-hydrocarbonoxycyclohexanone having the formula:

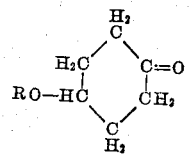

wherein R has the significance hereinbefore assigned, by the use of potassium dichromate and sulphuric acid [Helfer, Helv. Chim. Acta, 7, 953 (1924)].

The resulting para-hydrocarbonoxycyclohexanone is converted, via a Claisen reaction using diethyl oxalate and sodium ethoxide, into a 2-ethoxyalyl-4-hydrocarbonoxycyclohexanone having the formula:

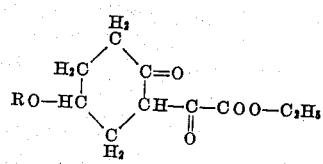

which is readily converted by means of heat and powdered soft glass into a 2-carbethoxy-4-hydrocarbonoxycyclohexanone having the formula:

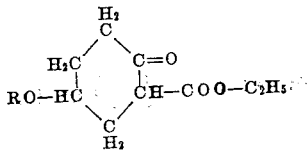

wherein R has the significance hereinbefore assigned.

The resulting 2-carbethoxy-4-hydrocarbonoxycyclohexanone is then condensed in the presence of sodium or potassium with a halogen-substituted tertiary amine having the formula:

$$X-CH_2CH_2-NR_2$$

wherein X is a halogen, e. g., chlorine or bromine, and each R is a hydrocarbon radical having the significance hereinbefore assigned. β-Diethylaminoethyl chloride is a typical example of such amine. Ordinarily the reaction is conducted in an inert organic solvent, such as benzene, toluene or xylene, at a temperature between approximately 80 and approximately 140 degrees centigrade, and preferably at about the reflux temperature of the solvent employed. The reaction is complete in from 10 to 20 hours, at the end of which time the product, a 2-carbethupoxy - 2 - (β - disubstituted aminoethyl) - 4 - hydrocarbonoxycyclohexanone having the formula:

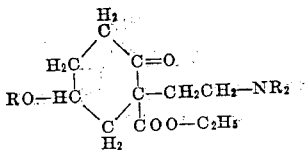

wherein the R's have the significance hereinbefore specified, may be isolated in conventional manner, such as by extraction from the organic layer with dilute acid, e. g., hydrochloric or sulfuric, and subsequent neutralization with alkali, e. g., potassium carbonate or sodium hydroxide. The crude product is then extracted with a solvent such as ether or benzene and isolated by evaporation of the solvent.

The following examples illustrate typical compounds of the invention and methods for their preparation. It will be understood that conventional changes and modifications may be adopted, as is obvious to those skilled in the art, without departing from the spirit or scope of the invention.

*Preparation 1.—4-methoxycyclohexanol and other 4-alkoxycyclohexanols*

A solution of 500 grams of 4-methoxyphenyl (monoethyl ether of hydroquinone) in 800 milliliters of ethanol was subjected to hydrogenation in the presence of 165 grams (wet weight) of a Raney nickel catalyst prepared by the method of Adkins and Pavlic [J. Am. Chem. Soc., 68, 147 (1946)]. The initial pressure of the hydrogenation at room temperature was between approximately 1000 and approximately 1800 pounds per square inch and the final temperature was approximately 140 degrees centigrade. The total time required for the hydrogenation was approximately 2 to 3 hours. After removal of the catalyst and solvent, distillation of the residue gave 445 grams (85%) of 4-methoxycyclohexanol as a colorless liquid boiling at 104–105 degrees centigrade at a pressure of 13 millimeters of mercury.

In a like manner, 4-ethoxycyclohexanol can be obtained by the hydrogenation of 4-ethoxyphenol (ethyl ether of hydroquinone); 4-propoxycyclohexanol can be obtained from 4-propoxyphenol; 4-n-butoxycyclohexanol can be obtained from 4-n-butoxyphenol; and 4-benzyloxycyclohexanol can be obtained from 4-benzyloxyphenol. These alkoxyphenols (ethers of hydroquinone) can be prepared by the method described by Klarmann, Gatyas and Shternov in J. Am. Chem. Soc., 54, 298 (1932).

*Preparation 2.—4-methoxycyclohexanone and other 4-alkoxycyclohexanones*

The oxidation of 4-methoxycyclohexanol (Preparation 1) was carried out according to the procedure of Helfer [Helv. Chim. Acta, 7, 953 (1924)]. To a solution of 90 grams of potassium dichromate in 120 grams of sulfuric acid and 400 milliliters of water cooled in an ice-bath was added with vigorous stirring 58.5 grams of 4-methoxycyclohexanol. The temperature of the reaction mixture rose rapidly to 70 degrees centigrade, and the color became brown. Stirring was continued until the temperature decreased, after which the product was extracted with ether, isolated by removal of the ether and purified by distillation; it boiled at 72 degrees centigrade at a pressure of 9 millimeters of mercury.

In a like manner, 4-ethoxycyclohexanone can be obtained by the oxidation of 4-ethoxycyclohexanol; 4-propoxycyclohexanone can be obtained from 4-propoxycyclohexanol; 4-n-butoxycyclohexanone can be obtained from 4-n-butoxycyclohexanol; and 4-benzyloxycyclohexanone can be obtained from 4-benzyloxycyclohexanol.

*Preparation 3.—2 - carbethoxy - 4 - methoxycyclohexanone and other 2-carbethoxy-4-alkoxycyclohexanones*

The preparation of this compound was carried out by the method heretofore described for the preparation of 2-carbethoxycyclohexanone (Snyder, Brooks and Shapiro, Org. Syntheses, Coll. vol. II, John Wiley and Sons, New York, 1943, p. 531; Cf. Cook and Laurence, J. Chem. Soc., 1938, 58). To a solution of 46 grams (2 moles) of sodium in 600 milliliters of absolute ethanol in an ice-salt bath was added at 10 degrees centigrade with vigorous stirring a cold solution of 256 grams (2 moles) of 4-methoxycyclohexanone (Preparation 2) in 292 grams (2 moles) of ethyl oxalate during a period of 15 to 20 minutes. The mixture was stirred at ice-bath temperature for about 1 hour and at room temperature for about 6 hours, acidified with ice-cold sulfuric acid, and extracted with benzene. After removal of the benzene on a steam-bath, about 25 grams of powdered soft glass was added to the residual 2-ethoxalyl-4-methoxycyclohexanone and the mixture was heated to 150 degrees centigrade with stirring at a subatmospheric pressure of approximately 50 millimeters of mercury until the evolution of carbon monoxide had ceased. Distillation of the residue gave 132.4 grams (33 percent) of 2-carbethoxy-4-methoxycyclohexanone as a heavy yellow oil which boiled at 100–105 degrees centigrade at a pressure of 1.2 millimeters of mercury.

In a like manner, 2-carbethoxy-4-ethoxycyclohexanone can be obtained by the ethoxalylation of 4-ethoxycyclohexanone followed by decarbonylation of the 2-ethoxalyl-4-ethoxycyclohexanone; 2 - carbethoxy - 4 - propoxycyclohexanone can be obtained from 4-propoxycyclohexanone;

2-carbethoxy-4-n-butoxycyclohexanone can be obtained from 4-n-butoxycyclohexanone; and 2-carbethoxy-4-benzyloxycyclohexanone can be obtained from 4-benzyloxycyclohexanone.

*Example 1.—2 - carbethoxy - 2 - (β - diethylaminoethyl) -4-methoxycyclohexanone*

To a suspension of 2.3 grams (0.1 mole) of sodium sand in 200 milliliters of anhydrous toluene was added dropwise with stirring a solution of 20.0 grams (0.1 mole) of 2-carbethoxy-4-methoxycyclohexanone (Preparation 3) in 25 milliliters of anhydrous toluene. After the addition, the mixture was heated under reflux with stirring for 3½ hours, and then stirred overnight at room temperature. The suspension of the sodio derivative was again heated to boiling and to it was added dropwise, with stirring during 3 hours, a solution of 13.6 grams (0.1 mole) of β-diethylaminoethyl chloride in 25 milliliters of anhydrous toluene. After heating under reflux for an additional 7 hours, the mixture was cooled and extracted with dilute hydrochloric acid. The acid extract was neutralized with sodium hydroxide solution, saturated with solid potassium carbonate and extracted with ether. The ether extracts were washed with water and dried, and the ether was evaporated. Distillation of the residue gave a 67 percent yield of 2-carbethoxy - 2 - (β-diethylaminoethyl) -4-methoxycyclohexanone as a nearly colorless liquid which boiled at 132–135 degrees centigrade at a pressure of 0.15 millimeter of mercury; $n_D^{20}=1.4715$.

*Other examples*

In a manner similar to that described in Example 1, 2 - carbethoxy - 2 - (β - di - n-butylaminoethyl) -4-benzyloxycyclohexanone can be obtained by the alkylation of 2-carbethoxy-4-benzyloxycyclohexanone with di-n-butylaminoethyl chloride, which can be prepared according to the procedures of Barnett et al. [J. Am. Chem. Soc., 59, 2248 (1937)] and Blicke and Maxwell [ibid., 64, 428 (1942)]; and 2-carbethoxy-2-(β-dibenzylaminoethyl) - 4-n-butoxycyclohexanone can be obtained by the alkylation of 2-carbethoxy-4-n-butoxycyclohexanone with dibenzylaminoethyl chloride, which can be prepared according to procedure of Dupre et al. (J. Chem. Soc., 1949, 500).

We claim:

1. A 2-carbethoxy-2-(β-aminoethyl)-4-hydrocarbonoxycyclohexanone having the formula:

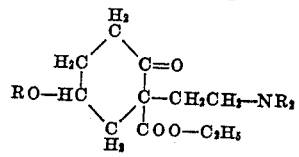

wherein each R is a hydrocarbon radical containing from one to seven carbon atoms, inclusive.

2. A 2 - carbethoxy-2-(β-di-lower-alkylaminoethyl)-4-lower-alkoxycyclohexanone.

3. A 2 - carbethoxy - 2 - (d-di-lower-alkylaminoethyl)-4-methoxycyclohexanone.

4. A 2 - carbethoxy-2-(β-dibenzylaminoethyl)-4-lower-alkoxycyclohexanone.

5. A 2 - carbethoxy - 2 - (β - di - n-butylaminoethyl)-4-lower-alkoxycyclohexanone.

6. A 2 - carbethoxy - 2-(β-diethylaminoethyl)-4-lower-alkoxycyclohexanone.

7. 2 - carbethoxy - 2 - (β - diethylaminoethyl) - 4-methoxycyclohexanone.

8. 2 - carbethoxy - 2 - (β - di - n - butylaminoethyl)-4-benzyloxycyclohexanone.

9. 2 - carbethoxy - 2 - (β - dibenzylaminoethyl)-4-n-butoxycyclohexanone.

JOHN A. HOGG.
JEROME KORMAN.
WILLIAM BRADLEY REID, JR.
ALAN H. NATHAN.

No references cited.